(12) United States Patent
Hansen et al.

(10) Patent No.: US 7,769,260 B2
(45) Date of Patent: Aug. 3, 2010

(54) INTERVENTION ROD

(75) Inventors: Henning Hansen, Dolores (ES); Mahmoud Farhadiroushan, Stanmore (GB); Richard Julius Kluth, London (GB)

(73) Assignee: Sensornet Limited (GB)

( * ) Notice: Subject to any disclaimer, the term of this patent is extended or adjusted under 35 U.S.C. 154(b) by 820 days.

(21) Appl. No.: 11/571,717

(22) PCT Filed: Jul. 7, 2005

(86) PCT No.: PCT/GB2005/050107
§ 371 (c)(1), (2), (4) Date: Jan. 5, 2007

(87) PCT Pub. No.: WO2006/003477
PCT Pub. Date: Jan. 12, 2006

(65) Prior Publication Data
US 2009/0260834 A1 Oct. 22, 2009

(30) Foreign Application Priority Data
Jul. 7, 2004 (GB) .................. 0415223.7

(51) Int. Cl.
G02B 6/44 (2006.01)
E21B 33/072 (2006.01)
E21B 23/14 (2006.01)
E21B 43/00 (2006.01)
E21B 19/22 (2006.01)
E21B 47/00 (2006.01)
H02G 1/08 (2006.01)
F16K 51/00 (2006.01)
B23P 11/00 (2006.01)

(52) U.S. Cl. .............. 385/100; 385/101; 385/12; 385/13; 166/385; 166/85.3; 166/66; 254/134.3 R; 137/315.01; 29/428; 174/68.1

(58) Field of Classification Search .......... 385/12, 385/13, 100, 101, 102, 103, 105, 106, 109, 385/110, 112, 113, 134, 136, 137, 138; 367/25, 367/13, 35, 81, 82, 83, 86, 160; 29/428; 174/8, 17 LF, 17 LG, 24, 68.1, 256, 68.3, 174/72 C, 138 D; 137/315.01; 254/134.3 R; 166/385, 85.3, 66
See application file for complete search history.

(56) References Cited

U.S. PATENT DOCUMENTS

| | | | |
|---|---|---|---|
| 5,234,058 A * | 8/1993 | Sas-Jaworsky et al. | 166/385 |
| 5,348,097 A | 9/1994 | Giannesini et al. | 166/385 |
| 6,157,761 A | 12/2000 | Wittrisch | 385/107 |
| 6,265,880 B1 * | 7/2001 | Born et al. | 324/541 |

(Continued)

Primary Examiner—Brian M Healy
(74) Attorney, Agent, or Firm—Barkume & Associates, P.C.

(57) ABSTRACT

A rod having an embedded optical fiber has a stiff composite outer layer (10) to make the rod self straightening to enable it to be pushed into a pipe or borehole from a spool. This can help enable a reduction of friction between rod and conduit and can enable longer reach. A barrier layer is provided to separate the fiber from the composite layer. The rod can be retrieved after use. The rod can be narrow enough to enable normal flow along the pipe or borehole, and can be injected and retrieved even when the pipe or borehole is pressurized. The fiber can be used for remote sensing of conditions along the conduit. Other tools can be inserted by the rod during the intervention.

43 Claims, 7 Drawing Sheets

U.S. PATENT DOCUMENTS

| | | | |
|---|---|---|---|
| 6,356,696 B1 | 3/2002 | Bakker et al. | 385/134 |
| 6,442,304 B1 * | 8/2002 | Crawley et al. | 385/12 |
| 6,691,734 B2 * | 2/2004 | Beals et al. | 137/317 |
| 7,154,081 B1 * | 12/2006 | Friedersdorf et al. | 250/227.14 |
| 2002/0066575 A1 | 6/2002 | Widney et al. | 166/380 |
| 2002/0189671 A1 * | 12/2002 | Beals et al. | 137/317 |
| 2009/0260834 A1 * | 10/2009 | Henson et al. | 166/385 |

* cited by examiner

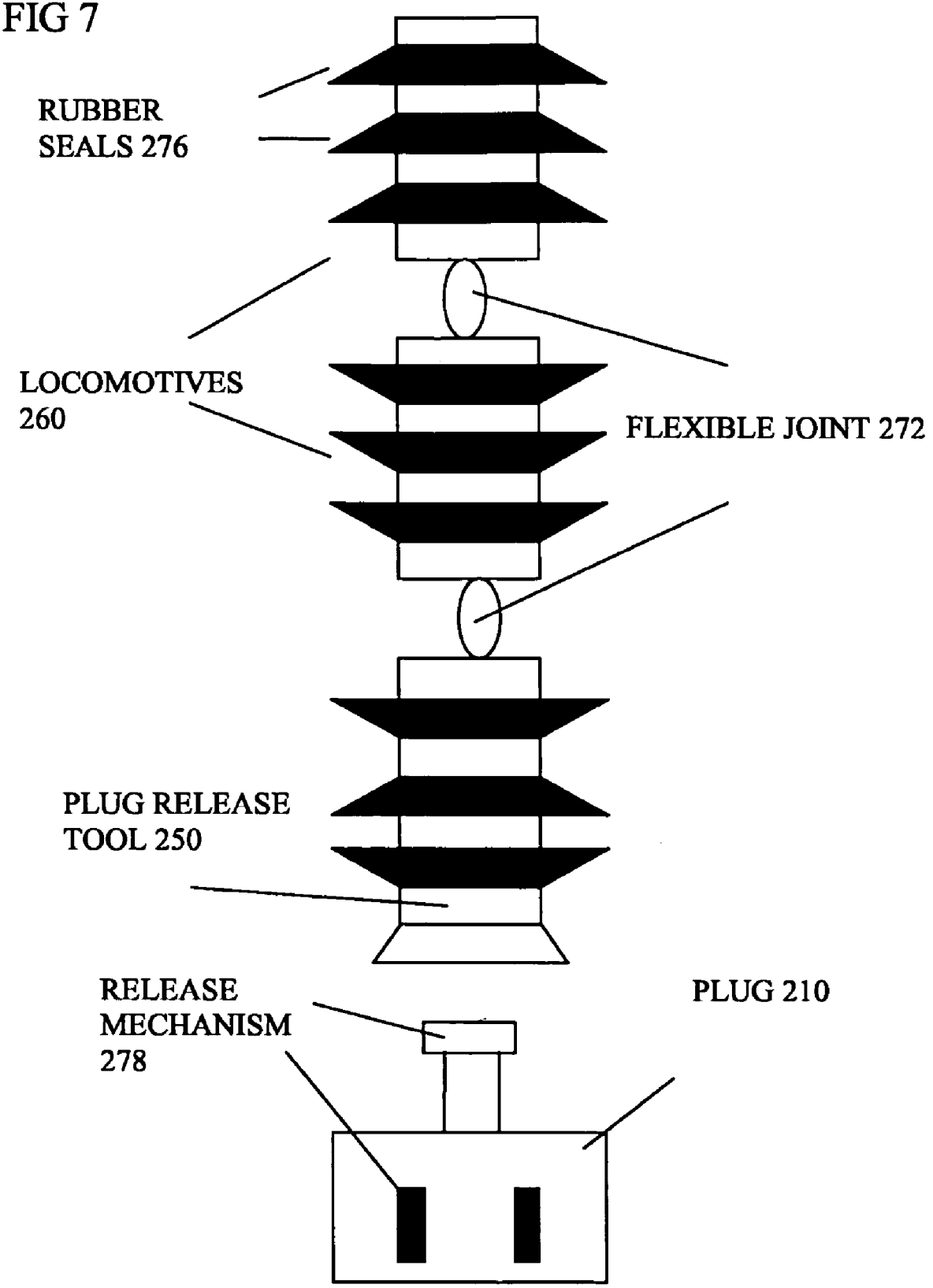

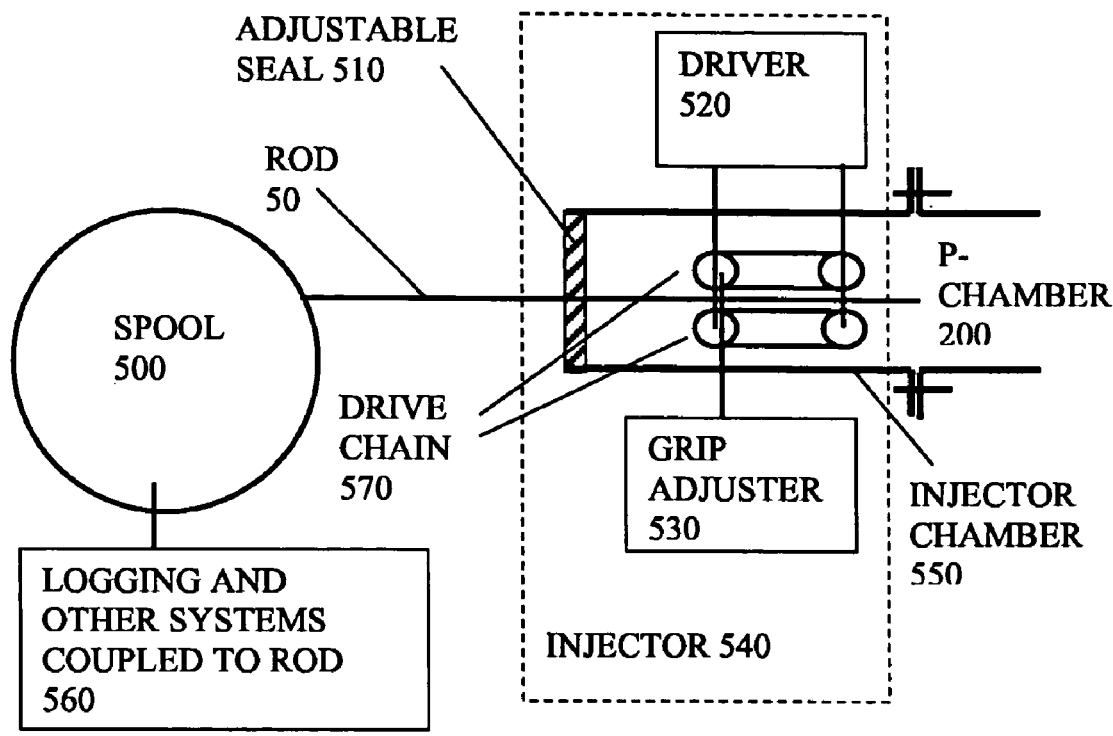
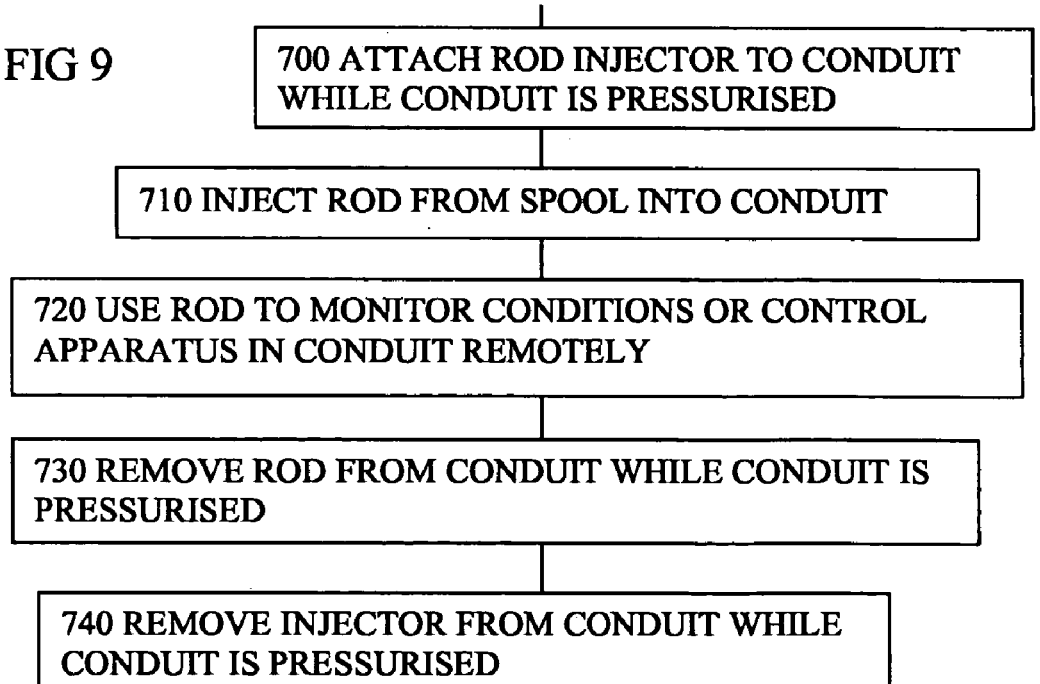

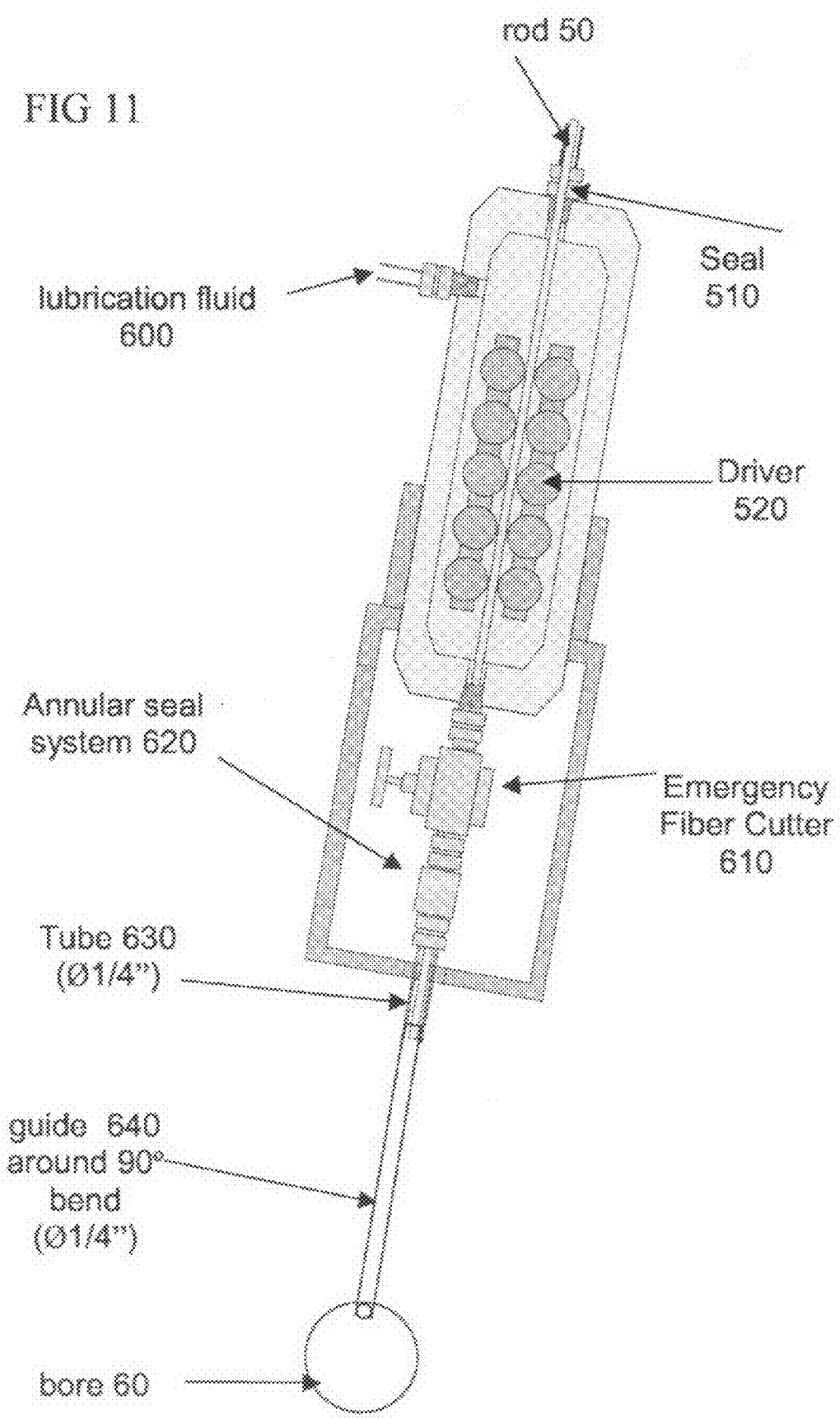

INTERVENTION ROD

FIELD OF THE INVENTION

The present invention relates to rods for intervention in conduits such as wellbores, to methods of manufacturing the same, to systems for monitoring such conduits, to apparatus for injecting a rod into a conduit, and apparatus for removing plugs to allow insertion of rods into pressurised conduits, to methods of carrying out an intervention process and to methods of operating a fluid transmission conduit.

BACKGROUND

There is a requirement in industry for the measurement of conditions such as strain or temperature at all points over long distances. Typical uses are for monitoring oil and gas wells, long cables and pipelines. A typical wellbore has seepage of unwanted contaminants, especially in later stages of the production life of an oil or gas field. Temperature profiles along the wellbore can indicate where there are seepages or other problems and this can enable remedial action. Distributed temperature sensors often use Raman or Brillouin components of scattered light in optical fibres as the means to determine the temperature. Here, light from an optical source is launched into a fibre and the small amount of light that is scattered back towards the source is analysed. By using pulsed light and measuring the returning signal as a function of time, the backscattered light can be correlated to distance along the fibre. This backscattered light contains a component which is elastically scattered (Rayleigh light) and components that are up- and down-shifted in frequency from the source light (Raman and Brillouin anti-Stokes and Stokes light respectively, also known as inelastic scattered light). The powers of the returning Raman components are temperature dependent and so analysis of these components yields the temperature. The powers and frequency of the returning Brillouin components are strain and temperature dependent and so analysis of both components can yield temperature and strain independently.

The principles of analysing Brillouin backscatter for measuring strain and temperature has been described before, and reference is made to:

Parker, T. R., Farhadiroushan, M., Handerek, V. A., and Rogers, A. J., "Temperature and strain dependence of the power level and frequency of spontaneous Brillouin scattering in optical fibres", Optics Letters, 1 Jun. 1997, Vol. 22, No. 11, pp. 787-789 and to:

Parker, T. R., Farhadiroushan, M., Feced, R., Handerek, V. A., Rogers, A. J., "Simultaneous Distributed Measurement of Strain and Temperature from Noise-Initiated Brillouin Scattering in Optical Fibres", IEEE Journal of Quantum Electronics, Apr. 1998, Vol. 34, No. 4, pp. 645-659.

If the frequency and power of the Brillouin backscatter can be measured then the strain and temperature in the fibre can be determined.

It is known to install a suitable fibre in a conduit such as a pipe or bore at the time of commissioning, or installing or lining the pipe or bore. There are various known methods of protecting the fibre from damage and for fixing the fibre. Once the pipe or bore is in use, and carrying a fluid, typically pressurised, it is more difficult and costly to add a sensing fibre, or to deploy one temporarily and withdraw it after sensing. It is known to interrupt production from an oil well to perform what is known as a wellbore logging intervention. This can involve lowering logging tools into the wellbore, using gravity pull. When the wellbore angle/deviation become too high, normally above 70 degrees, a so-called "well tractor" can be used to overcome friction. This "tractor" will drive the tools into their desired location.

Another known method involves using coiled tubing, where the logging tools are brought to their desired location by pushing the coiled tubing from surface. A problem with coiled tubing is that it is subjected to buckling due to the nature of the coil being bent on a spool when deployed, even though straightening mechanism are used on the coil before this enters the wellbore. This can prevent the coiled tubing from reaching more than several hundred meters. This is not far enough into the wellbore for many applications.

Both these methods ("tractor" and coiled tubing) are expensive in terms of requiring a considerable number of personnel to operate, and in the case of coiled tubing, the surface systems are large and it can take a long time to rig up on the wellhead.

Also, to perform an intervention in a well using above methods, there is a need for vertical headroom above the wellhead. This may need to be 5 meters or more. In some locations, especially on offshore platforms, such vertical rig-up space is not available due to a deck or similar structure above.

It is known from U.S. Pat. No. 6,557,249 to Pruett that a process of inserting a fibre includes a step of strengthening an optical fibre by adding a UV curable resin around the fibre, to enable the fibre to resist higher temperatures in environments such as underground wellbores and to give it some stiffness. The strengthened fibre is passed through an impeller using wheels or a caterpillar track which pushes the fibre into a duct, optionally through a pressure chamber. The strengthened fibre is flexible enough to be bent round a 12 inch radius, and so could be liable to buckle if inserted into a large diameter pipe. The patent proposes insertion into a pre installed quarter inch capillary tube. This capillary tube would be pre installed within the wellbore, but this involves a separate process which adds considerable cost and complexity.

It is also known to insert fibres into conduits by fluid flow along the conduit. This clearly is not practical if the normal flow is against the direction of insertion. In some cases a separate narrower duct could be inserted into the conduit and the fibre floated into the duct, but this adds to the complexity and expense of the operation.

SUMMARY OF THE INVENTION

It is an object of the present invention to provide improved apparatus and methods. According to a first aspect of the invention, there is provided:

A rod suitable to be pushed into a conduit from a spool, the rod having a utility service line running along the length of the rod, protected by a stiff outer structure to make the rod self straightening, so that when pushed into the conduit, the rod has substantially no residual curvature from the spool, the rod having a barrier layer to separate the service line from the stiff outer structure.

The use of a barrier layer can provide a number of advantages compared to known resin coated fibres for example. Firstly the service line can be protected somewhat from stresses in the stiff structure when the rod is pushed into the conduit. Such stresses can include axial compression and radial compression from impeller wheels. This is particularly important for service lines such as optical fibres. Secondly, the service line can be protected from stresses or high temperatures when the stiff structure is formed. This can enable stiffer or lighter materials to be used for the stiff structure for example. Thirdly the barrier can help enable the rod to have a broader cross section for more stiffness for a given weight.

The service line can include fibres, electrical data or electrical power lines or hydraulic power lines for example.

By incorporating the service line into the rod, rather than pre-installing a duct and then inserting the service line into the duct; the installation operation can be simplified and made more cost effective. By making the rod stiff enough to be pushed in, the complexity of using other methods such as using a tractor or fluid drag can be eased. The self straightening can mean reduced friction between rod and conduit caused by residual curvature of the rod, as in known metal tubing. This in turn can enable longer reach for intervention operations into the conduit.

An additional feature for a dependent claim is the service line comprising one or more optical fibres. These can be used for data communication or for remote sensing of conditions along the conduit.

An additional feature for a dependent claim is the service line comprising three or more embedded optical fibres offset from a central axis of the rod, for remote sensing of bending at any point along the rod. This can help enable detection of unwanted distortion in an existing conduit, or enable steering of a drill when boring a new conduit for example. The avoidance of any residual curvature can help make the bend measurements more accurate. This is especially useful where other methods such as GPS location cannot be used, such as in underwater pipes or underground bores for example.

An additional feature for a dependent claim is the service line comprising an electrical cable, the rod having a stiffener to make the rod being self straightening, so that when pushed into the conduit, the rod has substantially no residual curvature from the spool. Such a semi stiff self straightening rod has advantages beyond efficient insertion of a sensing fibre. Of course such a rod cannot perform much downward mechanical work, but its pulling strength will be high. This property can be used in a combination with downhole tools to perform required work inside the conduit.

Another additional feature is the rod having a sacrificial outer layer. This can enable more reuse of the rod, and reduce or avoid damage to the stiff layer such as micro cracking of composite or resin materials.

An additional feature for a dependent claim is to send high power optical laser emissions down the optical fibres encapsulated within the rod for ablation and or welding operations remotely.

An additional feature for a dependent claim is the stiff structure comprising an outer layer of a composite material to provide the self straightening. Another such feature is the rod having a diameter of less than 10 mm and the self straightening being sufficient to enable the spool to have a diameter of less than 2 m. Another such feature is a barrier layer of metal surrounding the fibre. An alternative barrier is an air gap, with or instead of the metal layer. Another such feature is the rod having a diameter less than one tenth the diameter of the conduit. This can enable relatively little interference with the amount of flow. Also the size and weight of the rod and spool can be kept low and made portable more easily. Another such feature is two or more fibres joined at one end. They can be coupled directly or through an optical component. This can enable two or more sensing measurements to be made for each location, and can enable more averaging, or cancelling of errors for example, without the expense of inserting separate rods. Another such feature is an electrical cable and an electrical tool at a leading end of the rod. Another such feature is a hydraulic pipe and a hydraulic powered tool at a leading end of the rod. These can enable a wider range of logging or other actions to be undertaken using appropriate tools at the end of the rod.

A second aspect also provides a system for remote sensing of bending of a conduit, comprising a rod having three or more embedded optical fibres, the system having a receiver arranged to determine stress at different points along the fibres, from light in the fibres, and being arranged to compare the stresses of the different fibres at a given location, to determine an amount of bending of the rod at the given location.

This can similarly help enable detection of unwanted distortion in an existing conduit, or enable steering of a drill when boring a new conduit for example.

As an additional feature, these bending sensing fibres are located around a core sensing fibre and within an outer barrier layer and an outer self straightening layer.

A third aspect provides a system for providing temporary monitoring of a conduit comprising a rod having one or more embedded optical fibres suitable for remote sensing of conditions along the conduit, and an injector arranged to push the rod into the conduit from a spool, the rod being self straightening, so that when pushed into the conduit, the rod has substantially no residual curvature from the spool, the system also comprising a means for transmitting and receiving light to and from the fibre and sensing conditions along the conduit from the received light.

As an additional feature the system can be arranged to carry out insertion and removal while the conduit is pressurised. Another additional feature is apparatus for removing a plug before insertion. Another additional feature is means for sealing the rod, and the means for inserting being arranged to pull the rod through the sealing means. Another additional feature is the conduit being a wellbore, the system being arranged for coupling to a wellhead.

A fourth aspect of the invention also provides a system for intervention into a pressurised conduit, the system having a rod, a spool for retaining the rod, remote controlled apparatus attached to the rod, and an injector arranged to push the rod and remote controlled apparatus into the conduit while the conduit is pressurised, the rod being self straightening, so that when pushed into the conduit from the spool, the rod has substantially no residual curvature from the spool, the system also having apparatus for operating the remote controlled apparatus remotely, and apparatus to remove the rod from the conduit while the conduit is pressurised.

Additional features include apparatus for removing a plug from the conduit before insertion of the rod, while the conduit is pressurised. The apparatus for removing a plug can comprise a pressure chamber and a piston movable axially in the chamber to remove or install the plug, and pressure control apparatus for moving the piston by altering the pressure across it while the conduit is pressurised. Another additional feature is a seal for sealing the rod so that the spool can be outside the pressurised conduit, and the injector being located on the conduit side of the seal, so as to pull the rod through the seal. Another feature is a coupling for attaching the injector to the conduit, and being arranged to carry out insertion without interrupting normal production flow or fluid transmission along the conduit.

A fifth aspect provides an injector for pushing a rod into a conduit, the conduit being pressurised, and having a seal for sealing against the rod, the system having a driver at one end of the conduit for applying an axial force to the rod within the conduit, to pull it through the seal and push it into the conduit.

An advantage of pulling through the seal is that the seal may have considerable friction, and the risk of buckling the rod by pushing it into the seal can be reduced. Additional features include a spool for retaining the rod outside the conduit, the rod having an embedded fibre, the spool having an optical coupling for sending or receiving light to or from a near end of the embedded fibre. Another additional feature is the rod having an embedded electrical cable, the spool having an electrical coupling for coupling electrical apparatus to a near end of the embedded cable. Another additional feature is an adjuster for adjusting a grip force of the injector on the rod. Another is a curved guide chamber for bending the rod between the spool and the conduit. The injector can be provided with apparatus for removing or fixing a plug in the conduit while the conduit is pressurised. An additional feature is the system being suitable for a wellhead A sixth aspect provides apparatus for removing or inserting a plug in an aperture of a pressurised conduit, the plug having an axially operated release mechanism, the apparatus comprising an elongate chamber for attaching over the aperture, to enable the conduit to remain pressurised, the chamber containing a piston arranged to cooperate with the release mechanism of the plug and means for adjusting the relative pressure on either side of the piston in the chamber to move the piston axially to operate the release mechanism to release or fix the plug.

This aspect also provides apparatus for removing or inserting a plug in an aperture of a pressurised conduit, the plug having a longitudinally operated release mechanism, the apparatus comprising an elongate chamber for attaching over the aperture, to enable the conduit to remain pressurised, the chamber containing a piston arranged to cooperate with the release mechanism of the plug and means for moving the piston axially in the chamber to operate the release mechanism to release or fix the plug, the chamber being arranged for use as curved guide for inserting a rod into the aperture. This can help enable the arrangement to be made more compact for use in areas with limited headroom above the aperture for example.

An additional feature is the apparatus being suitable for a wellhead. Other additional features include the conduit comprising a wellbore, and the apparatus having a coupling for coupling to a wellhead, the chamber having a valve for closing the conduit after the plugs have been removed, and means for removing the plug from the chamber and having a coupler for coupling a rod injection apparatus for injecting a rod through the chamber into the conduit while the conduit is pressurised.

The use of pressure to control movement of the piston can enable a more compact arrangement than known arrangements relying on gravity. It can also enable safer operation since the relative pressure across the piston can be monitored more easily.

A seventh aspect provides a method of carrying out an intervention having the steps of attaching a rod injector to a fluid transmission conduit, injecting a rod from a spool into the conduit, the rod being self straightening, so that when pushed into the conduit, the rod has substantially no residual curvature from the spool, using the rod to monitor conditions in the conduit or to control apparatus in the conduit remotely, removing the rod from the conduit, and detaching the injector.

Additional features include, the conduit being pressurised while the steps are carried out, the steps being carried out without interrupting normal production flow or fluid transmission along the conduit, or the rod being as set out above. Another aspect provides a method of operating a fluid transmission conduit while using the intervention process of the seventh aspect or using the apparatus of other aspects. This is a recognition that advantages of more efficient intervention can have a direct effect on the efficiency of operation of a fluid transmission conduit.

Other advantages will be apparent to those skilled in the art, especially in relation to other prior art not known to the inventors. Any of the additional features can be combined together and combined with any of the aspects, as would be apparent to those skilled in the art.

BRIEF DESCRIPTION OF THE DRAWINGS

Embodiments of the invention and how to put it into practice are described by way of example with reference to the accompanying drawings in which:—

FIG. 7 shows a tool for use in the pipe-bend chamber for removing a well head plug to enable installation of the rod, FIG. 8 shows an injection device for attaching to the pipe bend chamber, and FIGS. 9 and 10 show some of the principal steps of an intervention process for inserting and removing a rod according to an embodiment, and FIG. 11 shows an embodiment in which the rod is injected into a pre installed tube.

DETAILED DESCRIPTION

The embodiments described relate to performing a distributed temperature logging or other actions in a conduit such as a wellbore by inserting/pushing a stiff spooled intervention rod, for example manufactured of a composite or a hard plastic material, into the wellbore from one end. Clearly the aspects of the invention can be applied or implemented in other ways. In cases where the wellbore contains elevated pressure, a sealing system against the intervention rod must be used to prevent wellbore fluid leakages to the environment. As the intervention rod is manufactured to be straight and stiff, the rod can be pushed into the conduit without risk of buckling and jamming in the conduit, or for longer distances before friction between the rod and the conduit becomes too great.

The intervention rod can be pushed from surface, using an injector system constructed with feeding wheels, chain drive, or similar, and it can be pushed to a desired distance. This distance can be as deep as it is possible to go in the wellbore, and then the rod can be left in position for logging data about the conditions along the conduit. At the surface, a data acquisition system is connected to the intervention rod. Using fibre optic based distributed temperature logging, the surface data acquisition system can pick up the temperature and/or stress or other parameters, anywhere along the intervention rod. Temperature data in particular can provide very valuable data about well hardware performance, reservoir performance, flow rates and so on. After sufficient data has been obtained, the rod can be rewound onto the spool and the wellhead can be resealed. Notably this can enable intervention in the conduit to be carried out more quickly, more simply, with fewer personnel, and less disruption to normal flow in the conduit, (production flow in the case of a wellbore), using lighter, more portable equipment, or achieving greater reach along the conduit, than other methods.

For wellbore applications where there is limited vertical headroom above the wellhead available, a bent connection or flexible coupling can be connected to the top of the wellhead. This can enable the rod to be fed in from the spool at an angle to the axis of the conduit. A section of horizontal lubricator can be used if necessary, to help reduce the friction at the bend. At the end of the lubricator or coupling, a sealing arrangement for the intervention rod is incorporated. Such an intervention rod can contain fibre optic cable(s), electric cable(s) as well as hydraulic tube(s). Hence, the intervention rod can be equipped for many applications, such as distributed fibre optic temperature sensing, pressure monitoring, plus other electrical and/or fibre optic sensing. The lower or leading end of the intervention rod can also be connected to various hydraulic, fibre optic and/or electrical operated tools.

Figure 1:
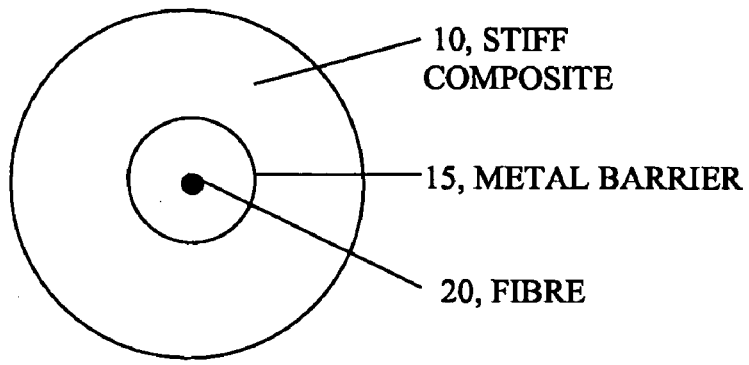
FIGS. 1 to 3 show an intervention rod in cross section according to embodiments of the invention.

FIG. 1 shows a first embodiment of a rod for use in such intervention operations. It includes a fibre 10 at a centre of the rod to minimise axial stress on the fibre when the rod is bent. It may have a cladding layer or layers for protection from physical damage and to maintain desired light transmission properties. A metal barrier layer 15 is useful if the fibre is to be used for long periods in harsh environments such as wellbores. This should be relatively thin and of small diameter so that any curvature when the rod is taken off the spool is completely overcome by the self straightening nature of the surrounding stiff composite layer. This can be made of materials such as carbon composite, Polyetheretherketone (PEEK), Polychlorotrifluoroethylene (PCTFE).

There can be multiple fibres in a bundle at the core for example, to enable more simultaneous measurements for example. The diameter of the composite is typically much greater than the diameter of the fibre. The diameter depends on the distance to be reached by the rod, and the diameter of the conduit. Also, an allowance should be made for wear of the rod as it is inserted and removed from the conduit, the allowance depending on how many times it will be inserted, and how abrasive is the surface of the conduit. The rod can be made in one piece for simplicity and strength, though it could be made in sections with suitable connectors, to enable it to be spooled on a number of separate spools. For example, for a reach of 2,000 m, along a typical five inch wellbore, an overall diameter of approximately 5-10 mm could be used. The rod is provided with a rounded or cone shaped leading "nose" made of a hard material and having a larger diameter than the rod, to help avoid snagging on rough sides of the conduit.

Figure 2:
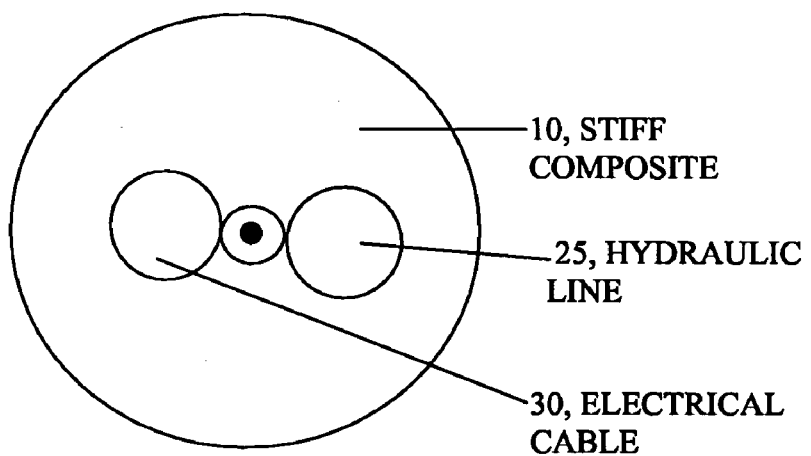

FIG. 2 shows another embodiment of a rod. In this case the rod additionally includes other lines such as an electrical cable 30 and a hydraulic line 25. These are used to enable suitable tools to be operated in the conduit via the rod. Such tools are well known and need not be described here in more detail. Other lines can be included as well. The overall diameter of the rod would depend on what is included, but could reach 10-30 mm for example. The hydraulic lines in particular should be wide enough to enable pressure changes to propagate down the lines fast enough to enable tools to be operated at the leading end of the rod.

Figure 3:
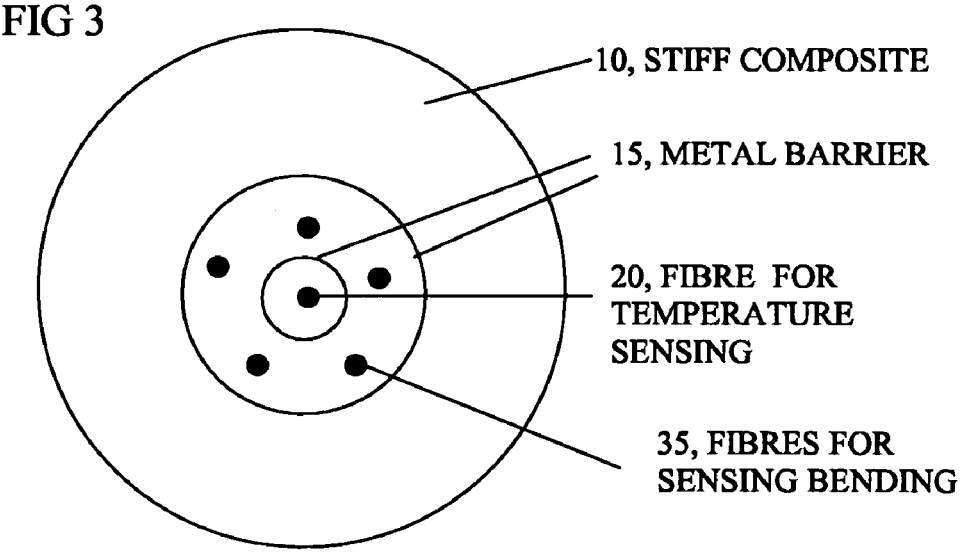

FIG. 3 shows another embodiment of a rod. In this case the rod additionally includes other fibres 35. These are arranged evenly around the core fibre 20. The core fibre can be used for temperature sensing and should be free of axial stress. The other fibres are arranged away from the core so that they are susceptible to axial stress when the rod is bent. The fibres on the outside of a bend will be stretched and those on the inside of a bend will be compressed. These stresses can be determined from changes in the light received from the fibres, and the amount of bending at different locations can be deduced. This can be used to enable the course of a bore or pipe to be mapped, or to steer a drill for example.

Figure 4:
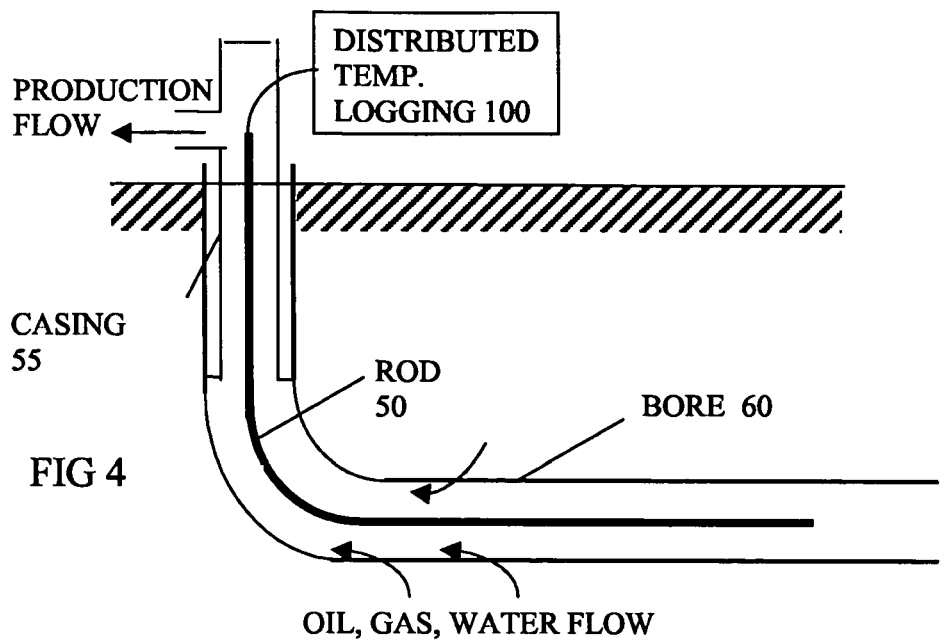
FIGS. 4 and 5 show in schematic form a rod installed in a wellbore according to embodiments of the invention.
Figure 5:
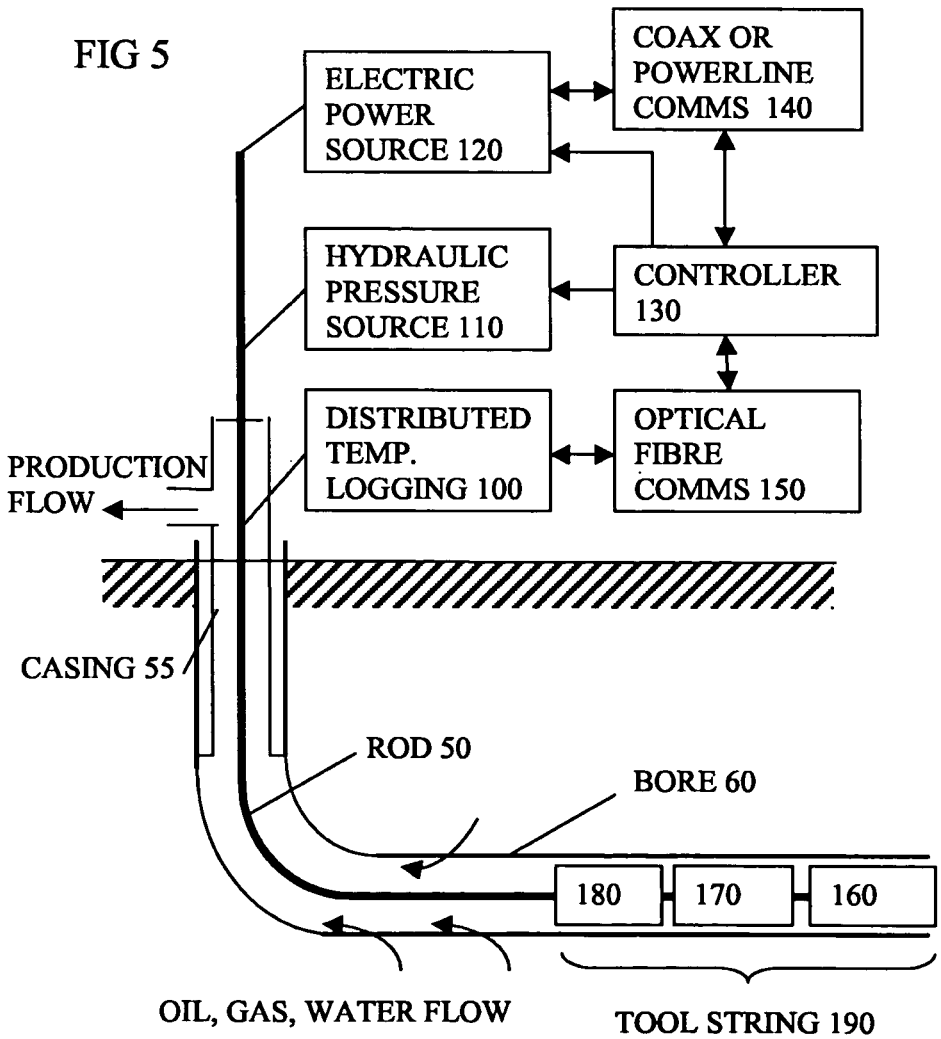

FIGS. 4 and 5 show examples of the rod in use in a wellbore. In FIG. 4 it is used only for logging. The rod 50 could be as shown in FIG. 1. It is coupled to a distributed temperature logging system 100 at the wellhead on the surface (or seabed, or sea surface). The bore 60 is typically large enough to take a 10 inch steel casing 55 for a vertical part which can extend anything from hundreds to thousands of meters. The bore typically narrows to a 5 inch bore, 60 and is curved very gradually to extend horizontally for anything up to several thousand meters. Typically there are many boreholes serviced from a single wellhead location, each extending in different horizontal directions to cover a large area of the oil or gas field. At the wellhead, the production flow is typically fed away to one side through valves, and a removable cap suitable to resist high pressures is placed on the top, to enable vertical access into the wellbore for drilling tools or conventional intervention methods for example. The temperature logging system can be arranged to determine stress at different points along the rod, either for use in correcting temperature measurements, or for determining bending, particularly if used in association with a rod such as that shown in FIG. 2. The stress measurements can be made using established measurement principles which need not be described here in detail.

FIG. 5 shows another example of an intervention rod in use. In this case, similar reference numerals to those of FIG. 4 have been used as appropriate. In this case, a tool string 190 is attached to the leading end of the rod. There are many possible types of tools, including for example a hydraulic powered clamping and drilling tool 160, a sealing and lining tool 170, and logging tools 180 for logging temperature, gamma ray activity, flow rate and so on. These can be powered by the electrical cable, and return data either by a coax cable or over a fibre for example. At the surface, the rod is coupled to a hydraulic pressure source 110, and an electric power source 120. A controller 130 is provided to control the tools and the power. Data communications for logging and for control of the tools can be provided by optical fibre communications part 150, for transmitting and receiving signals optionally over a fibre shared with the distributed temperature logging system, or over a separate fibre. The data communications could also be carried out using a coax or power line system 140, following established practice.

Figure 6:
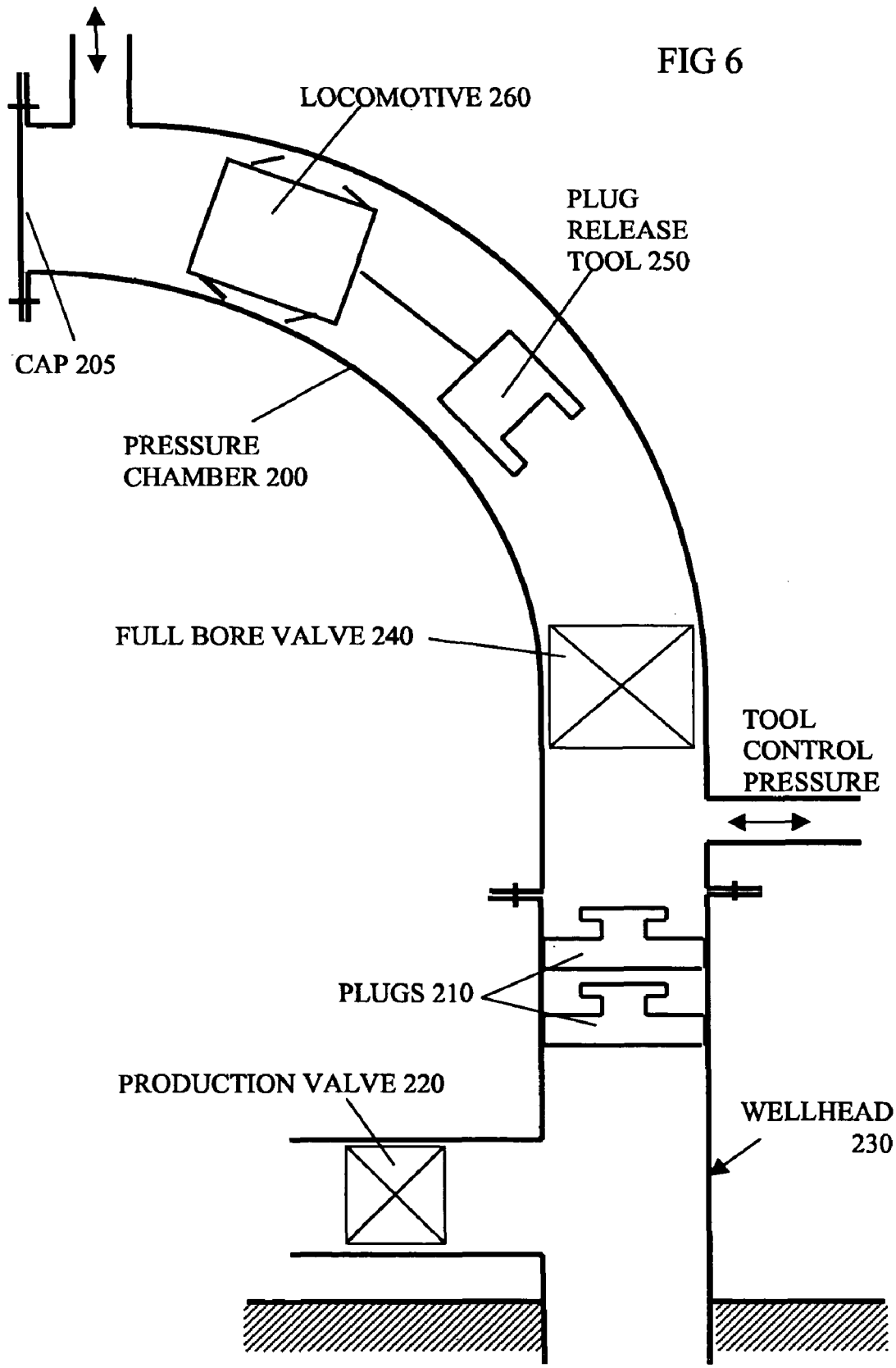
FIG. 6 shows a pipe-bend chamber for installing a rod according to an embodiment.

FIG. 6 shows an example of a pressure chamber 200 for attaching to the wellhead, to enable the rod to be injected. In this case, first, plugs 210 need to be removed. To do this while the wellbore is under pressure, the chamber is arranged to withstand the necessary pressure and is provided with a suitable coupling to the wellhead. The chamber can be straight or curved. The curved shape can enable operation where there is limited headroom for example. This is often the case on rigs having a derrick structure for lifting lengths of piping in or out of bore holes. The derrick is movable over any of a number of adjacent boreholes. When the rig is operating on one borehole, the supporting deck for the derrick can leave limited headroom over the other adjacent boreholes for perhaps 95% of the time. It would be useful to be able to carry out intervention processes during this time without having to wait for the deck to be moved.

FIG. 6 shows the wellhead 230 has a junction to allow flow along a production path past a production valve 220. The chamber has a full bore valve 240 for closing the bore after the plugs have been removed, yet being wide enough when open to allow tools to pass into the bore. The chamber has a cap 205 to seal a far or top end, yet allow other apparatus to be coupled to the chamber. Inside the chamber is shown a piston in the form of plug release tool 250 coupled to a locomotive 260, and movable axially along the chamber. The plug release tool is arranged to cooperate with the release mechanism of the plugs 210. To move the locomotive and the tool, the chamber has means for adjusting the relative pressure on either side of the piston in the chamber. This can enable the tool to operate the release mechanism to release or fix the plug, simply by up and down movement along the axis of the bore. A pressure control opening is provided at either end of the chamber to enable the locomotive to be driven far enough to enable the tool to reach the plugs. The use of pressure to control movement of the piston can enable a more compact arrangement than known arrangements relying on gravity. It can also enable safer operation since the relative pressure across the piston can be monitored more easily, and the motion of the tool or plug can be deduced from pressure changes.

To release the plug, the pressure should be equalised on either side of the full bore valve and the valve opened, to enable the tool to be moved beyond the valve to the plugs. Then the movement of the tool can be controlled by controlling the pressure at the top and bottom openings into the chamber. More details of how the tool can be used will be explained with reference to FIG. 10.

FIG. 7 shows a side view of an example of a locomotive and plug release tool for use with the chamber of FIG. 6. Two locomotives 260 are shown, coupled in the form of a train by flexible joints 272, to allow the train to pass around the curve of the chamber. The locomotives have flexible rubber seals 276 or flaps around the body of the locomotive to form a seal with the cylindrical side of the chamber, so that the locomotive can be moved by the fluid in the chamber. The flaps are angled either upwards or downwards according to which direction they are intended to drive the locomotive.

FIG. 7 also shows a plug release tool 250 having a lower end shaped to engage a release mechanism 278 of the plug 210. These plug release mechanisms can have various configurations following established principles, to enable them to be fixed firmly but releasably, using only up and down actions on a top surface. These plug types, and the methods for installing and releasing them, are well known to the industry. There are several basic methods for locking and unlocking them, but all methods are based on upward or/and downward movement of a built-in exposed prong or tube (called "fishing neck"). These "fishing necks" normally have machined profile, internally or externally, which the setting or pulling tool engages. Some of the release mechanisms have shear pins incorporated, which will shear off by upward or/and downward movement of the prong/tube.

The release tool has a mechanism for attaching the plug to enable the plug to be withdrawn reliably through the valve 240.

FIG. 8 shows an injector 540 which can be added to the pressure chamber. The injector has an injector chamber 550, containing drive chains 570 or some similar arrangement for applying longitudinal force to the rod. The chain is driven by a driver 520, and the grip force on the rod can be adjusted by an adjuster 530. The rod is pulled through a seal 510, which is also adjustable to ensure a good seal without too much friction. The rod is pulled off a spool 500, and a far end of the rod is attached to logging and/or other systems 500 as described above. Optionally the injector can be placed on the wellhead directly, without the pipe bend chamber, if there is headroom, and if there is a suitable valve on the wellhead. Optionally the injector chamber can be incorporated with the pressure chamber, and if there is a need for plug removal, then some way of removing the plugs out of the chamber will be needed if they cannot be moved past the drive chain. A separate passage or exit branching off the main axis could be provided for this.

FIG. 9 shows a flow chart of some of the steps of an intervention process using the rod. At step 700, a rod injector is attached to the conduit, while the conduit is pressurised. At step 710, the rod is injected from the spool and pushed along the conduit. At step 720, the rod is used to monitor conditions or control the apparatus in the conduit remotely. This can encompass detecting bending along the conduit. Step 730 involves removing the rod from the conduit while the conduit is pressurised, after the monitoring or other operation is complete. Optionally some of the apparatus may be left in the conduit. In the case of a production well or pipeline, production or transmission of fluid may continue at all times. Step 740 optionally involves removing the injector from the conduit, to restore it to its original condition, if other equipment needs to access the conduit.

Figure 10:
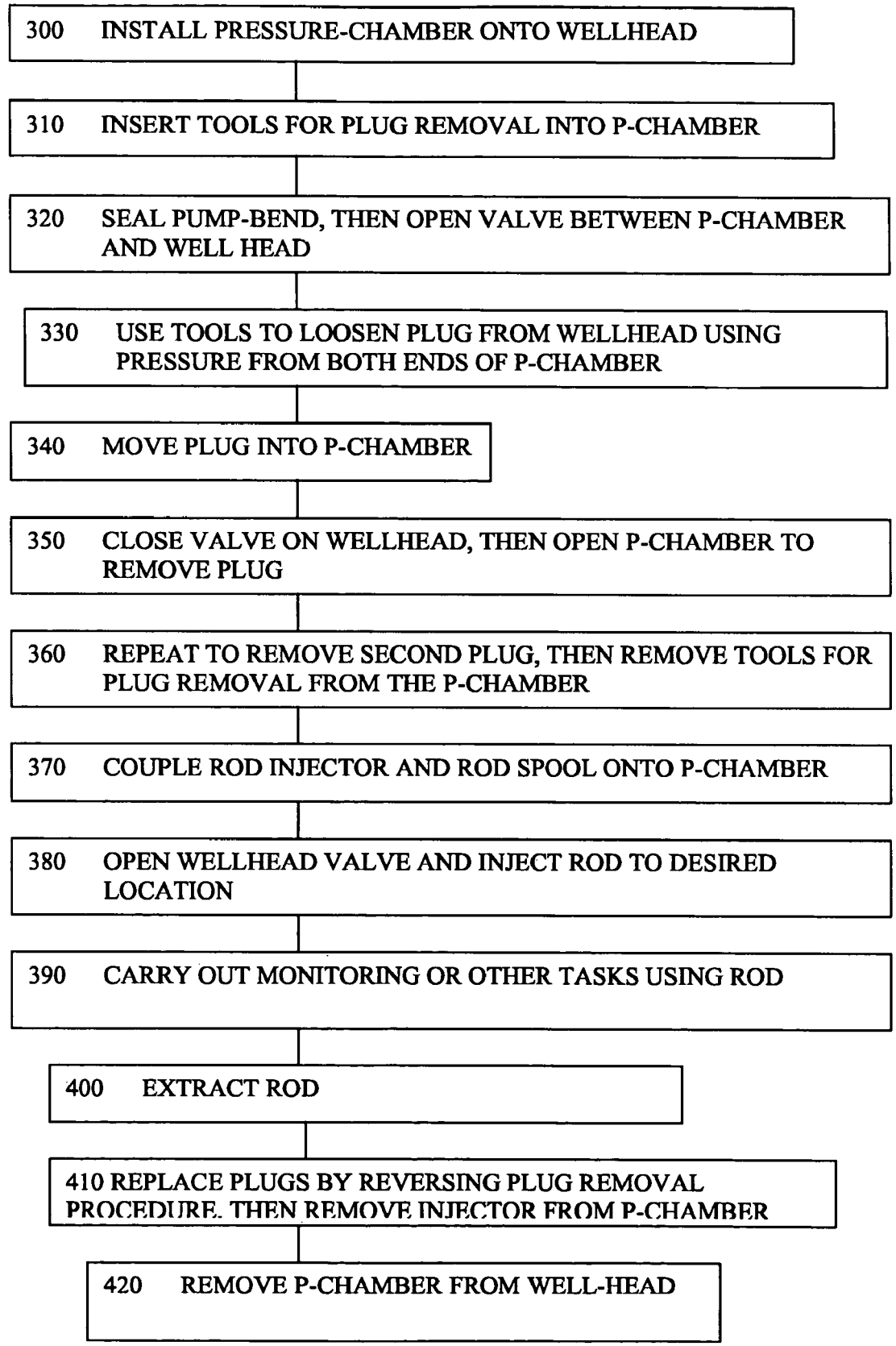

Some of the principal steps of an intervention process as shown in FIG. 10 will now be explained in more detail:

1. Remove the (wellhead) cap. Ensure first that there is no pressure trapped below this.

2. Install pressure chamber (exemplified below by "pump-bend" or "lubricator", with full bore ball valve for main bore in open position, and attach fluid pumping system. This is shown as step 300. This "pump-bend" unit is only required in applications where a restricted vertical space above the wellhead prevents a straight lubricator from being used. Hence, many applications will use a lubricator without a bend instead of the "pump-bend", but the procedure and technology here will be similar.

3. Step 310, insert pump-down tool system (consisting of for example 2 each "locomotives" and one pulling tool with flexible joints between these) for wellhead plug retrieval, into the chamber. A hydraulic operated jar which is a hydraulic operated hammer, which will stroke downward or upward depending on hammer type utilized can also be included in this tool string.

4. Install pump-in coupling and piping required to upper end of "pump-bend". At step 320, the chamber is closed, and the full bore valve opened.

5. Pressure test "pump-bend" assembly to required pressure and time.

6. Keep lower fluid entry/exit port open, and pump slowly in at upper side of "pump-bend". Monitor pressure on chart recorder.

a. Tool string will move into "pump-bend" and will then latch onto the plug in the wellhead, step 330.

b. This can be verified by monitoring pressure on the chart recorder; A sharp pressure increase from stable pressure means that pulling tool has landed on top of plug. Depending on plug type and releasing method of this, it will also be possible to see pressure response according to activities taking part in the plugs releasing mechanism.

7. Open upper fluid entry/exit port, and pump slowly into the lower side of the "pump-bend". Monitor pressure on chart recorder.

a. Pump fluid into port and monitor that the tool string are moving upwards, shown as step 340.

b. When tool string is in the upper section of the "pump-bend", a sharp pressure increase can be seen as the tool string can move no further.

8. Step 350, close full bore ball valve on "pump-bend" and bleed off pressure within "pump-bend".

9. Step 350, when pressure has been bled off, remove upper connection of "pump-bend" and take out tool string.

10. Step 360, if another plug has to be removed from the wellhead, repeat above step 3 to 9.

11. An optional step is installing a guide wheel assembly into "pump-bend". This will ease the intervention rod passage through the "pump-bend". It may be narrower diameter than the plugs, and so needs to be installed after plug removal.

12. Step 370, mount the rod-injector sub to the upper end of the "pump-bend", and connect this to its drive mechanism, which can be hydraulic or electrically driven or similar.

13. Insert intervention rod until this stops on top of full bore ball valve.

14. Tighten up compression nut and energize seal(s) against intervention rod.

15. Pressure test "pump-bend" and rod-injector sub assembly to required pressure and time.

16. Bleed down to well pressure, and open full bore ball valve, as shown at step 380.

17. Inject intervention rod into the well to the desired depth.
    a. The length of intervention rod inserted into the well can be verified by length markings on rod, by reading off the counter on the rod-injector, as well as by monitoring the temperature or stress along the intervention rod for example.
    b. Adjust torque on compression nut to obtain minimum drag against intervention rod.

18. Perform logging or intervention task(s) required, shown by step 390.

19. Pull out intervention rod by using the spooler that the rod is installed onto, and/or the rod-injector (step 400).
    a. Closely monitor the rod when this is coming out of the wellbore, to ensure that the well pressure is not pushing the rod uncontrolled out of the well.
    b. Adjust compression nut and/or rod-injector to prevent unwanted rod blowout.
    c. Check continuously depth of rod, and stop pull out of this when the rod is above the full-bore ball valve.

20. Close full bore ball valve.

21. Bleed off pressure within the "pump-bend" to atmospheric.

22. Pull remaining intervention rod out of the "pump-bend".

23. If wellhead plug(s) are now to be re-installed, (step 410) perform this according to following procedure. If another rod intervention is to be performed, follow above steps 12 to 22.
    a. If continuing according to below, remove guide wheel assembly in "pump-bend" if such a guide has been installed.

24. Insert pump-down tool system (consisting of for example 2 "locomotives" and one setting tool with flexible joints between these) for wellhead plug installation. The new plug must also be mounted on the lower end of this tool string. A hydraulic operated jar can also be included in this tool string.

25. Install pump-in coupling and piping required to upper end of "pump-bend".

26. Pressure test "pump-bend" assembly to required pressure and time.

27. Keep lower fluid entry/exit port open, and pump slowly in at upper side of "pump-bend". Monitor pressure on chart recorder.
    a. Tool string will move into "pump-bend" and the plug will then latch onto its profile within the wellhead.
    b. This can be verified by monitoring pressure on the chart recorder; A sharp pressure increase from stable pressure means that the plug has landed into its receptacle profile (typically a recess in the wall of the bore). Depending on plug type and setting method of this, it will also be possible to see pressure response according to activities taking part in the plug locking mechanism.
    c. Pressurize above tool string until setting tool shears loose from plug.

28. Open upper fluid entry/exit port, and pump slowly into the lower side of the "pump-bend". Monitor pressure on chart recorder.
    a. Pump fluid into port and monitor that the tool string are moving upwards.
    b. When tool string is in the upper section of the "pump-bend", a sharp pressure increase can be monitored.

29. Close full bore ball valve on "pump-bend" and bleed off pressure within "pump-bend".

30. When pressure has been bled off, remove upper connection of "pump-bend" and take out tool string.

31. If another plug has to be installed in the wellhead, repeat above step 24 to 30.

32. When completed, rig down intervention system, including removing pump bend chamber (step 420) and re-install wellhead cap.

FIG. 11 shows an embodiment in which the injector injects the rod into a small diameter tube. The rod 50 is fed from a spool (not shown). The rod passes through the seal 510 to the driver 520. Lubrication fluid 600 is fed in to the tube via the driver or elsewhere. For example, the driver could be located outside the seal and the lubrication fluid could be injected after the seal. The driver would then push the rod through the seal. From the driver and lubrication fluid, the rod is fed into an emergency fiber cutter 610, if this is needed, then to an annular sealing system if this is needed either for emergency use or to enable the injector to be separated and removed. From there the rod passes into the tube 630 which is pre installed in the bore hole 60. It is typically attached to the side of a lining of the bore, as the lining is inserted section by section into the bore hole. It is of sufficiently small diameter relative to the bore hole that flow is the bore hole is not interrupted. There may be a 90 degree bend 640 if desired, to enable the driver to be horizontal, above a vertical bore hole.

Prior to injecting semi-stiff fiber assembly into (nominally Ø¼" wellbore conduit for example), the conduit formed by the tube is flushed with friction reducing lubrication fluid. Several types of known lubricant can be used depending on the application, depending for example on the depth of the bore, temperature, the diameter of the tube, and the fluid in the bore, for example.

While injecting ("pushing") semi-stiff fiber assembly into conduit, the lubricant can be pressurised and circulated. Optionally the tube may have a return path so that the lubricant can be circulated and reused. The seal at fiber assembly entry can be an adjustable type seal, similar to the well known "stuffing box" technology used in wireline operations. When the fiber assembly has been installed to depth, the injector system will be bled to zero. Then, the injector can be disconnected from the conduit at the location above the cutting valve. Optionally the fiber in the rod can be connected to a sensing system after the injector is separated, or the injector can be left in position and the sensing system can be coupled to the fiber, optionally via the spool if that is not removed. The circulation of the lubricant can also help to regulate the temperature of the rod during the injection process.

CONCLUDING REMARKS

As has been described above, a rod having an embedded optical fibre has a stiff composite outer layer 10 to make the rod self straightening to enable it to be pushed into a pipe or borehole from a spool. This can help enable a reduction of friction between rod and conduit and can enable longer reach. A barrier layer is provided to separate the fibre from the composite layer. The rod can be retrieved after use. The rod can be narrow enough to enable normal flow along the pipe or borehole, and can be injected and retrieved even when the pipe or borehole is pressurised. The fibre can be used for remote sensing of conditions along the conduit. Other tools can be inserted by the rod during the intervention. Although described for wellbore applications, other applications can be conceived including remote inspection of or operations on other structures including pipes, buildings, and hazardous or inaccessible areas. Other variations within the claims can be conceived.

The invention claimed is:

1. A rod suitable to be pushed into a conduit from a spool, the rod having a utility service line having an optical fibre running along the length of the rod, protected by a stiff outer structure to make the rod self straightening, so that when pushed into the conduit, the rod has substantially no residual curvature from the spool, the rod having a barrier layer to separate the optical fibre of the service line from the stiff outer structure and to protect the optical fibre from the axial and radial stresses in the stiff outer structure.

2. The rod of claim 1, the service line comprising one or more of an optical fibre, an electrical data line, an electrical power line and a hydraulic power lines.

3. The rod of claim 1, the service line comprising three or more embedded optical fibres offset from a central axis of the rod, for remote sensing of bending at any point along the rod.

4. The rod of claim 1, having a sacrificial outer layer.

5. The rod of claim 1, the outer structure comprising a composite material to provide the self straightening.

6. The rod of claim 1, having a diameter of less than 10 mm and the self straightening being sufficient to enable the spool to have a diameter of less than 2 m.

7. The rod of claim 1, the barrier layer comprising a layer of metal surrounding the service line.

8. The rod of claim 1, the service line having two or more fibres joined at one end.

9. The rod of claim 1 having an embedded electrical cable and an electrical tool at a leading end of the rod.

10. The rod of claim 1 having a hydraulic line and a hydraulic powered tool at a leading end of the rod.

11. A system for remote sensing of bending of a conduit, comprising the rod of claim 1, the rod having three or more embedded optical fibres offset from a central axis of the rod, the system having a receiver arranged to determine stress at different points along the fibres, from light in the fibres, and being arranged to compare the stresses of the different fibres at a given location, to determine an amount of bending of the rod at the given location.

12. The system of claim 11, the rod having a core sensing fibre and the system being arranged to determine temperature from light in the core sensing fibre.

13. A system for providing temporary monitoring of a conduit comprising the rod of claim 1, the rod having an optical fibre, and an injector arranged to push the rod into the conduit from a spool, the rod being self straightening, so that when pushed into the conduit, the rod has substantially no residual curvature from the spool, the system also comprising a means for transmitting and receiving light to and from the fibre and sensing conditions along the conduit from the received light.

14. The system of claim 13, arranged to push the rod into and remove the rod from the conduit while the conduit is pressurised.

15. A system for intervention into a pressurised conduit used for fluid transmission, the system having a rod, a spool for retaining the rod, remote controlled apparatus attached to the rod, and an injector arranged to push the rod and remote controlled apparatus into the conduit while the conduit is pressurised, without pre-insertion of a tube for the rod, the rod being self straightening, so that when pushed into the conduit from the spool, the rod has substantially no residual curvature from the spool, the system also having apparatus for operating the remote controlled apparatus remotely, and apparatus to remove the rod from the conduit while the conduit is pressurised.

16. The system of 11, the rod comprising one or more optical fibres, the system comprising apparatus for sending high power optical laser emissions down the optical fibres suitable for remote controlled ablation and or welding operations.

17. The system of claim 11 having apparatus for removing a plug from the conduit before insertion of the rod, while the conduit is pressurised.

18. The system of claim 17, the apparatus for removing a plug comprising a pressure chamber and a piston movable axially in the chamber to remove or install the plug, and pressure control apparatus for moving the piston by altering the pressure across it while the conduit is pressurised.

19. The system of claim 13 having a seal for sealing the rod so that the spool can be outside the pressurised conduit, and the injector being located on the conduit side of the seal, so as to pull the rod through the seal.

20. The system of claim 13, the system having a coupling for attaching the injector to the conduit, and being arranged to carry out insertion without interrupting normal production flow or fluid transmission along the conduit.

21. A system having a rod of claim 1 and an injector for pushing a rod into a conduit, the conduit being pressurised, and having a seal for sealing against the rod, the system having a driver at one end of the conduit for applying an axial force to the rod within the conduit, to pull it through the seal and push it into the conduit.

22. The system of claim 21 having a spool for retaining the rod outside the conduit, the rod having an embedded fibre, the spool having an optical coupling for sending or receiving light to or from a near end of the embedded fibre.

23. The system of claim 21, the rod having an embedded electrical cable, the spool having an electrical coupling for coupling electrical apparatus to a near end of the embedded cable.

24. The system of claim 21, having an adjuster for adjusting a grip force of the injector on the rod.

25. The system of claim 21, having a curved guide chamber for bending the rod between the spool and the conduit.

26. The system of claim 21 having apparatus for removing or fixing a plug in the conduit while the conduit is pressurised.

27. Apparatus for removing or inserting a plug in an aperture of a pressurised conduit, the plug having an axially operated release mechanism, the apparatus comprising an elongate chamber for attaching over the aperture, to enable the conduit to remain pressurised, the chamber containing a piston arranged to cooperate with the release mechanism of the plug and means for adjusting the relative pressure on either side of the piston in the chamber to move the piston axially to operate the release mechanism to release or fix the plug.

28. Apparatus for removing or inserting a plug in an aperture of a pressurised conduit, the plug having a longitudinally operated release mechanism, the apparatus comprising an elongate chamber for attaching over the aperture, to enable the conduit to remain pressurised, the chamber containing a piston arranged to cooperate with the release mechanism of the plug and means for moving the piston axially in the chamber to operate the release mechanism to release or fix the plug, the chamber being arranged for use as curved guide for inserting a rod into the aperture.

29. The apparatus of claim 27, the conduit comprising a wellbore, and the apparatus having a coupling for coupling to a wellhead.

30. The apparatus of claim 27, the chamber having a valve for closing the conduit after the plugs have been removed.

31. The apparatus of claim 27, having means for removing the plug from the chamber and having a coupler for coupling a rod injection apparatus for injecting a rod through the chamber into the conduit while the conduit is pressurised.

32. A method of carrying out an intervention having the steps of attaching a rod injector to a fluid transmission conduit, injecting a rod from a spool into the conduit, without pre-insertion of a tube for the rod, the rod being self straightening, so that when pushed into the conduit, the rod has substantially no residual curvature from the spool, using the rod to monitor conditions in the conduit or to control apparatus in the conduit remotely, removing the rod from the conduit, and detaching the injector.

33. The method of claim 32, the conduit being pressurised while the steps are carried out.

34. The method of claim 32, the steps being carried out without interrupting normal production flow or fluid transmission along the conduit.

35. The method of claim 32, the rod being suitable to be pushed into a conduit from a spool, the rod having a utility service line running along the length of the rod, protected by a stiff outer structure to make the rod self straightening, so that when pushed into the conduit, the rod has substantially no residual curvature from the spool, the rod having a barrier layer to separate the service line from the stiff outer structure.

36. A method of operating a fluid transmission conduit while using the intervention process of claim 32.

37. A method of operating a fluid transmission conduit while using a rod suitable to be pushed into a conduit from a spool, the rod having a utility service line having an optical fibre running along the length of the rod, protected by a stiff outer structure to make the rod self straightening, so that when pushed into the conduit, the rod has substantially no residual curvature from the spool, the rod having a barrier layer to separate the optical fibre of the service line from the stiff outer structure and to protect the optical fibre from the axial and radial stresses in the stiff outer structure.

38. The system of claim 13, the conduit comprising a tube pre installed within a bore hole and of sufficiently small diameter to avoid interfering with fluid flow in the bore hole.

39. The system of claim 17, the conduit being filled with a lubricating fluid during insertion or removal of the rod.

40. The system of claim 18, arranged to circulate the lubricating fluid along the tube during insertion or removal of the rod.

41. The system of claim 16, the rod having a friction reducing outer coating.

42. A method of using the injector of claim 21 for installing a rod into a conduit comprising a tube pre installed within a bore hole and of sufficiently small diameter to avoid interfering with fluid flow in the bore hole, the rod being suitable to be pushed into a conduit from a spool, the rod having a utility service line running along the length of the rod, protected by a stiff outer structure to make the rod self straightening, so that when pushed into the conduit, the rod has substantially no residual curvature from the spool, the rod having a barrier layer to separate the service line from the stiff outer structure.

43. The method of claim 42 having the step of using the rod once installed, for sensing conditions along the bore hole.

* * * * *